Aug. 30, 1938.　　　W. J. PETER ET AL　　　2,128,499
LIQUID DISPENSER
Filed June 29, 1937　　　5 Sheets-Sheet 4
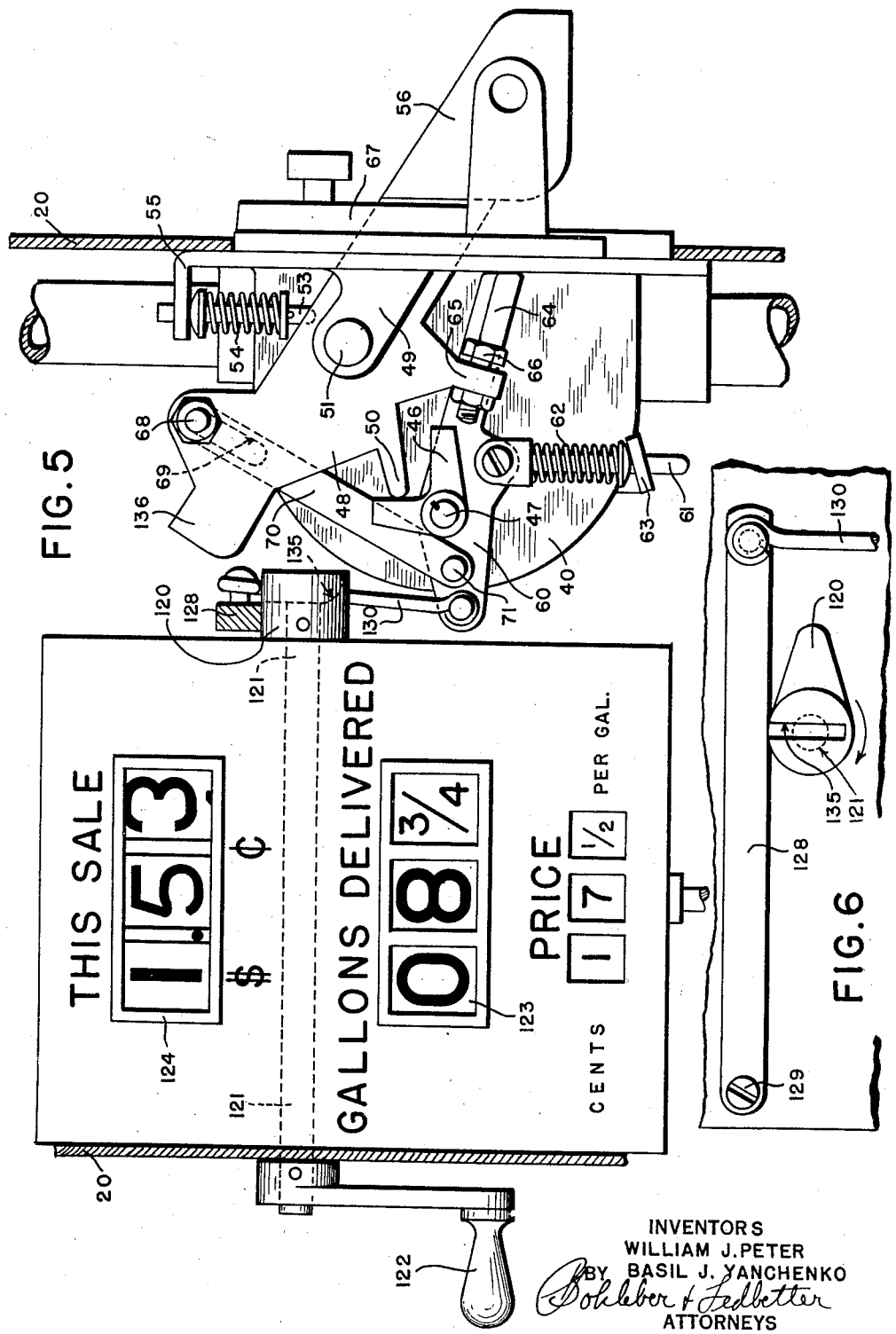
INVENTORS
WILLIAM J. PETER
BASIL J. YANCHENKO
BY Dohleber & Ledbetter
ATTORNEYS

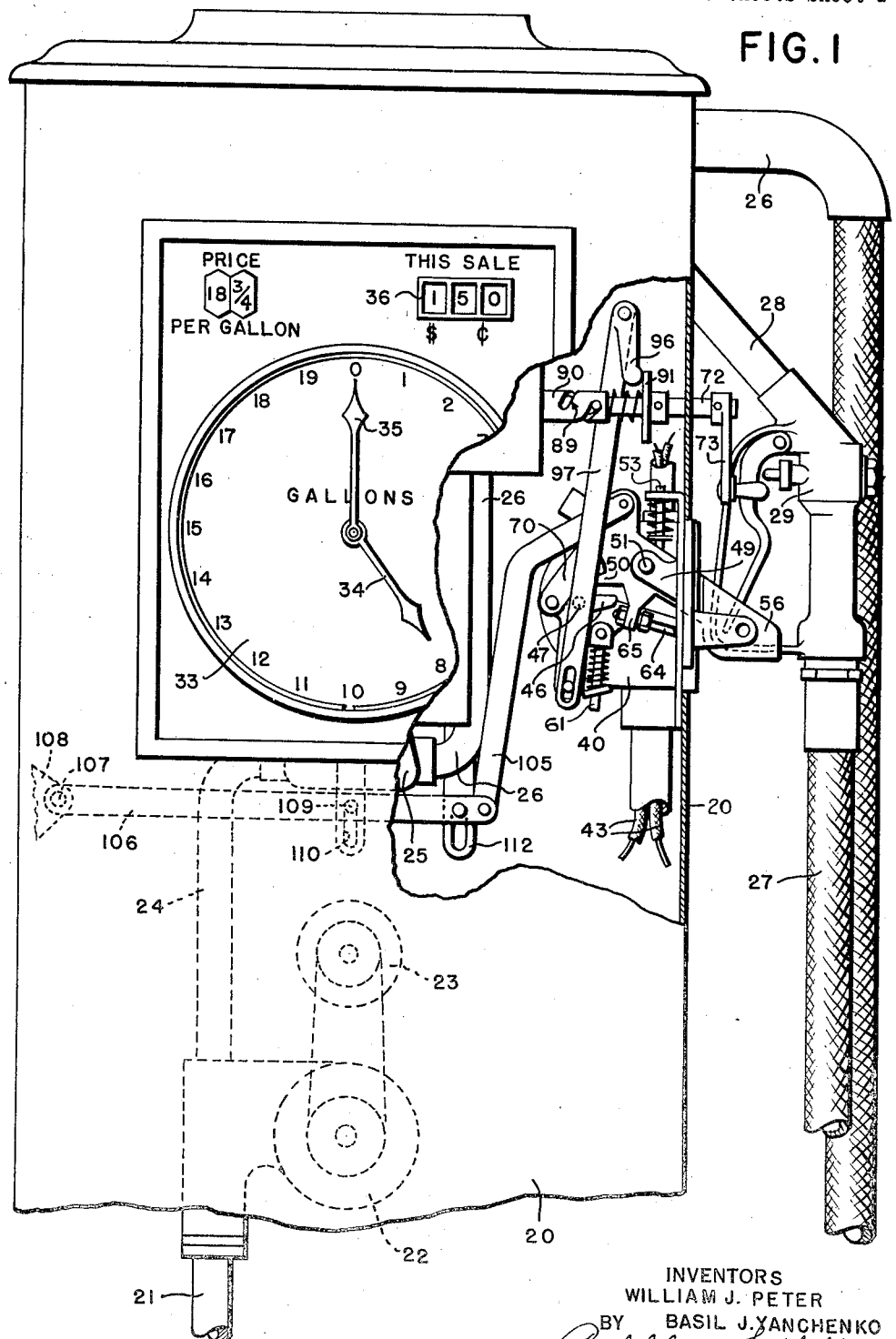

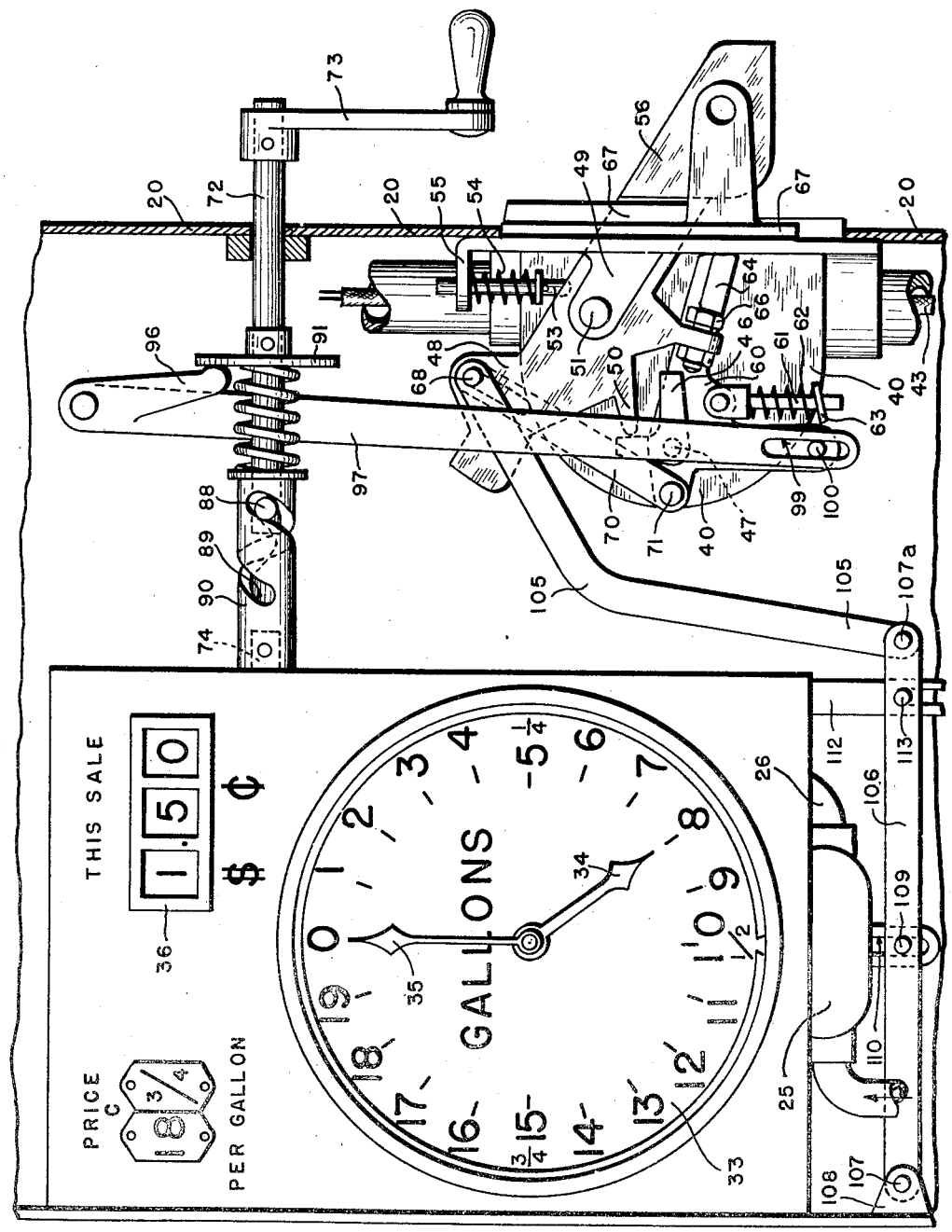

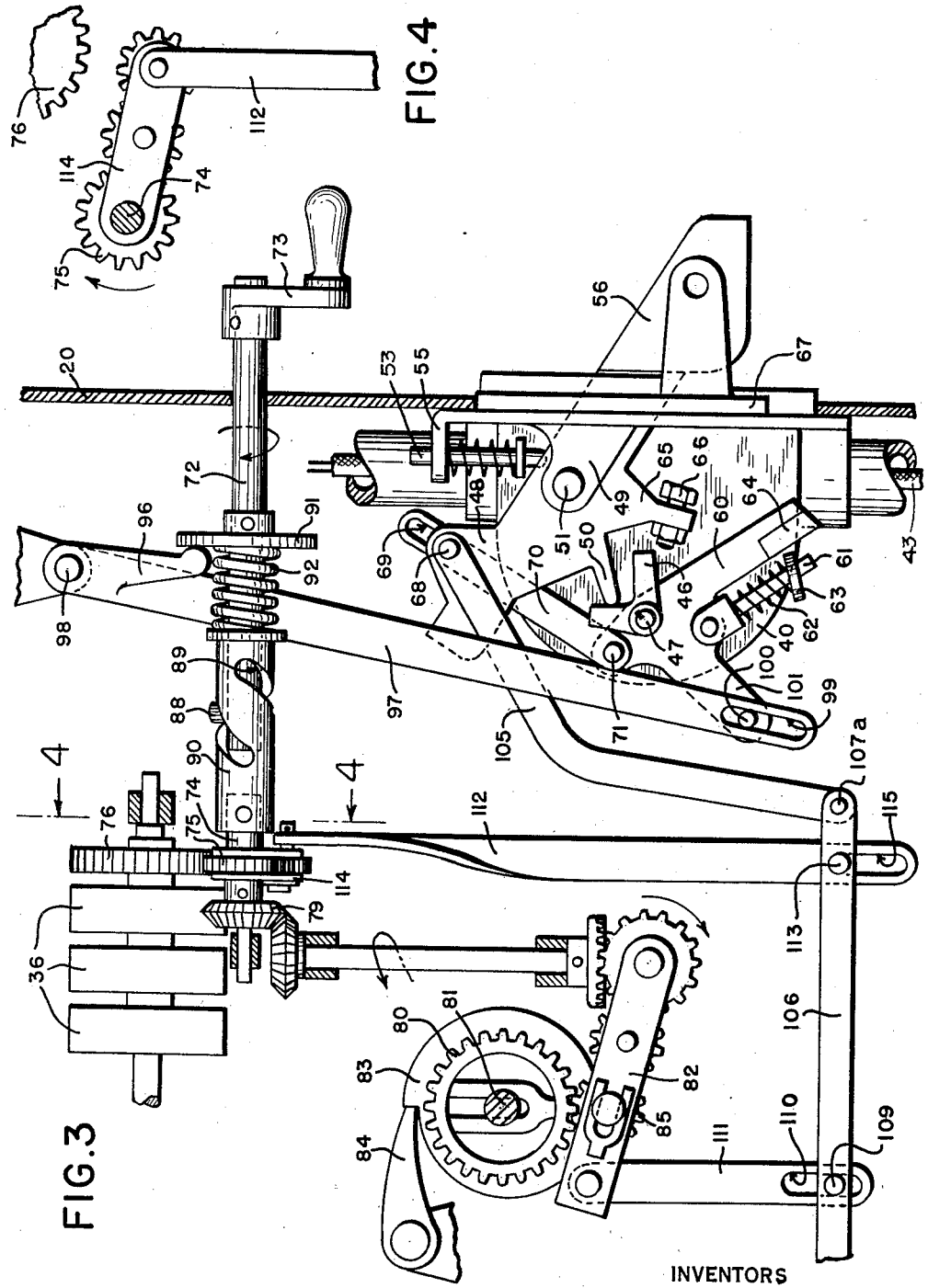

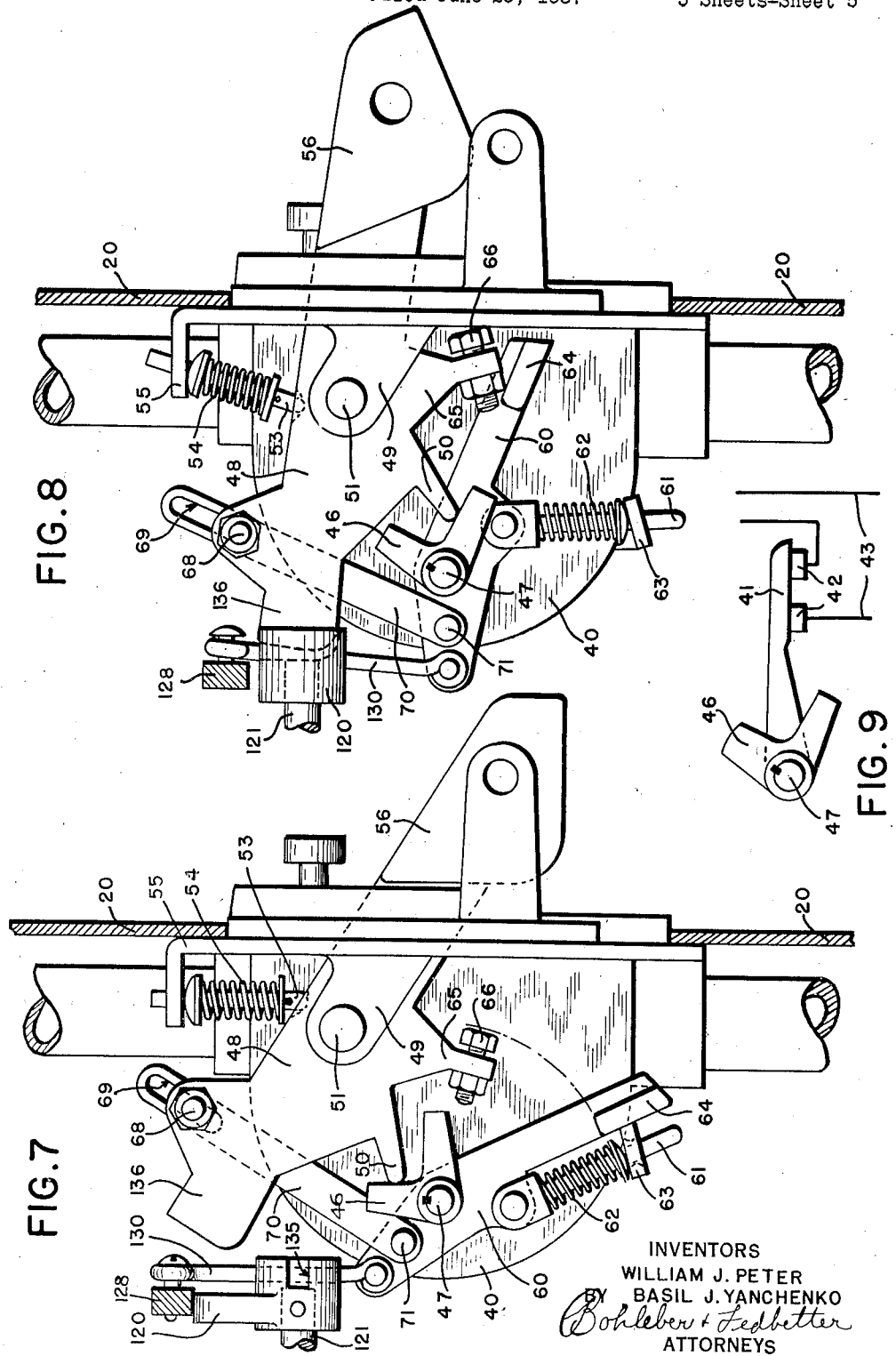

Patented Aug. 30, 1938

2,128,499

UNITED STATES PATENT OFFICE 2,128,499

LIQUID DISPENSER

William J. Peter and Basil J. Yanchenko, New York, N. Y., assignors to Aqua Systems Incorporated, New York, N. Y., a corporation of New York Application June 29, 1937, Serial No. 150,896

13 Claims. (Cl. 221—95)

The invention relates to a liquid dispenser by means of which the quantity of liquid passing through the dispenser is measured, and particularly relates to dispensers for the delivery of gasoline. The dispenser may be of any suitable type, two examples of which are curb and panel dispensers. The invention is applicable to any type of dispenser.

The invention to be described herein relates particularly to a resetting and interlocking mechanism for the indicator or indicators of the dispenser which show the gallons delivered or the cost of the liquid delivered, or both the gallons and the cost. The resetting means is associated with an interlocking mechanism by means of which the operator is compelled to reset the indicator or indicators to zero position or reading before it is possible for the switch to be closed and the dispenser to be operated to deliver liquid or gasoline to a second customer. Other interlocking means is utilized between the indicator resetting means and the switch operating means whereby it is impossible for an operator to in any way fraudulently control the dispensing of gasoline from the dispenser.

It is an object of the invention to construct a new and novel resetting and interlocking mechanism between the indicator or indicators of a liquid dispenser and the liquid flow control means or switch which requires the operator, after one delivery of liquid or gasoline has been made to a customer, to reset the indicator or indicators to zero position or reading before delivery of liquid can be made to another customer.

Another object is to construct a liquid dispenser having control means such as a switch for controlling the flow of liquid through the dispenser, which control means is associated with a resetting means for returning the indicators or registers to zero position so that the control means is locked in its position in which liquid cannot flow through the dispenser until the resetting means has been operated to return the indicators or registers to zero position. This indicator resetting means and liquid flow control means are interlocked so that the resetting means cannot be operated as long as the liquid flow control means is in liquid flowing position.

Another object of the invention is to construct a liquid dispenser having electrical means controlling the pumping or liquid flow mechanism, which electrical means is controlled by a switch. The switch is associated with a new and novel resetting and interlocking means for returning the indicators or registers to zero position so that the switch operating means is locked in open position and cannot be again operated to close the switch until after the indicators or registers have been returned to zero position or reading.

A still further object is to provide structure for the purpose stated in the preceding paragraph and in addition provide an interlocking mechanism which prevents the indicator or indicators from being reset so long as the switch is in closed position and liquid is flowing.

Other objects of the invention will be more apparent from the following description taken in connection with the accompanying drawings showing a preferred embodiment of the invention, in which:

All of the figures in the drawings illustrate the same operating means for the liquid control means or switch, and the same locking means for preventing closing of the switch. Figures 1 through 4, however, show a first form of the invention utilizing an indicator resetting means adapted particularly for resetting an indicator which requires an indeterminate amount of movement or rotation in order to reset the indicator to zero reading. Where such an indicator is used, one form of interconnection must be used between the indicator resetting means and the locking means to move the latter to released position. Figures 1 through 4 also show one form of means for preventing the resetting of the indicators so long as the switch is closed. This first form of the invention also shows how two indicators may be reset, one indicator being reset by rotation of the resetting handle in one direction, and the other indicator being reset upon rotation of the resetting handle in the other direction.

Figure 1 is a view of the upper part of a gasoline dispenser which houses the indicators or registers, the resetting and interlocking means, the liquid flow control means, and may house the liquid flow producing means as well as the motor means for driving the latter. A part of the casing is broken away to show the resetting and interlocking means which is also associated with a nozzle supporting means, and a valved nozzle is shown on the end of the hose, which nozzle is in position on the nozzle supporting means. The interlocking means is in position preventing operation of the switch.

Figure 2 is an enlarged view of the resetting and interlocking means shown in Figure 1. The view is partially diagrammatic in that the indicator dials are shown in half size in comparison to the resetting and interlocking means and are not shown in their true position in order that the invention may be better illustrated.

Figure 3 is an enlarged view of the resetting and interlocking means in the position assumed by the parts after the resetting means has been operated and has returned the indicators to zero position or reading. The indicator resetting means has also released the locking means so that the liquid flow control means or switch may be again operated to make a second delivery of gasoline.

Figure 4 is a view taken on line 4—4 of Figure 3 and shows that the clutch operating means between the resetting handle and the cost indicator or counter is identical with the clutch operating means between the resetting handle and the gallon indicator. The clutch operating means is in disengaged position.

Figures 5 to 8 inclusive illustrate a different form of connection between the indicator resetting means and the switch locking means, which connection is adapted for indicators which can be returned to zero reading upon a fixed movement or number of revolutions of the resetting means in one direction. Figures 5 through 8 also show a form of means for preventing resetting of the indicators when the switch is closed which is different from the means shown in Figures 1 through 4 for performing the same function.

Figure 5 shows the resetting and interlocking means in position with the liquid flow control means or switch locked in position so that it cannot be operated to make a second delivery of gasoline. The indicators or registers are shown giving the gallons delivered and the cost of the gallons which have been delivered. The resetting of the indicators to zero reading is the next step in the complete operation of the mechanism.

Figure 6 is a partial view showing the means operated by the indicator resetting means for releasing the locking means for the liquid flow control means or switch.

Figure 7 shows the resetting and interlocking means with the locking means for the liquid flow control means or switch moved away from locking position.

Figure 8 shows the resetting and interlocking mechanism in its position in which the liquid flow control mechanism has been moved so that the liquid flow producing means is creating a liquid flow, and with the resetting means for the indicators locked against movement. The embodiment illustrated in this figure shows manual operation of the liquid flow control mechanism.

Figure 9 is a view showing a switch without a casing and in closed position as an example of any form of switch which may be used with the indicator resetting and interlocking mechanism.

The liquid dispenser to be described herein provides a completely integrated mechanism so that it is impossible to fraudulently operate the same. One of the easiest ways of fraudulently dispensing gasoline from any type of dispenser is to operate the resetting mechanism while the pump is delivering gasoline. By this procedure, the cost of the sale and the number of gallons registered on their respective indicators or registers may be considerably less than the final reading after the desired quantity of gasoline has been delivered. In other words, with the dispenser and the resetting and interlocking mechanism to be described herein, an operator cannot reset the indicators so long as gasoline is being delivered. The mechanism herein prevents the above described as well as all other fraudulent operations of the dispenser.

In the construction to be described herein, it is also impossible to have the indicators showing some reading of gallons and cost when beginning the delivery of gasoline so that the customer is overcharged. Such an advanced or initial reading upon the indicators cannot be accomplished either by partial rotation of the indicators from a zero reading or by failure to completely reset the indicators to zero position or reading after a delivery of gasoline has been made.

The gasoline dispenser to be particularly described herein is one utilizing a switch to control the liquid flow means. In some aspects of the invention a switch need not be employed so long as some flow control means is provided and the resetting and interlocking mechanism is interconnected with this flow control means regardless of what form it may take.

There is shown in Figure 1 the upper portion of a liquid dispenser, such as is commonly used for dispensing gasoline and generally termed a curb type dispenser. The invention to be described is applicable to any type of gasoline or liquid dispenser. The dispenser illustrated has a stand or casing 20 in which the various parts of the dispenser are housed. An inlet pipe 21 is adapted to lead to a storage tank in which gasoline is stored. The inlet pipe is connected with a pump 22 driven by an electric motor 23 which forces the gasoline through the pipe 24 which is connected with a meter 25. Gasoline, after passing through the meter, flows through the pipe 26 to the hose 27 and out through the nozzle 28 on the end of the hose, which nozzle preferably has a valve 29 therein so that the operator may control the flow at the nozzle.

Although an electric motor driven pump is shown as creating the flow of liquid through the dispenser, it is to be understood that any other liquid flow producing means, such as gravity and water displacement, is contemplated.

The meter 25 is connected with one or more indicators, such as the gallon indicator 33 which is of the dial type and having the pointers 34 and 35 to indicate the quantity of liquid or gasoline delivered. A cost indicator or register 36 is also connected and driven by the liquid meter 25 to indicate the cost of the liquid dispensed. The cost register is generally connected with the meter through mechanism, usually of some change gear type, which may be adjusted or changed in accordance with the varying unit price of gasoline or liquid dispensed. This mechanism, however, constitutes no part of the present invention. The cost register 36 is shown as being what is termed a straight reader or counter type as distinguished from a dial indicator, such as the gallon indicator 33. Any form of cost indicator or register is contemplated.

The electric motor 23 is controlled by a switch of any suitable type, shown in the form of a switch box 40, but generally referred to herein as the switch 40. The type of switch particularly shown has contact points 41 and 42 (see Figure 9), one of which is movable into contact with the other in order to complete an electric circuit through the motor. The switch shown and described is merely illustrative and any type of switch is contemplated. Closing of the switch operates the motor which drives the liquid flow producing pump 22 to create a flow of gasoline through the meter 25 and to the nozzle 28. In the broader aspect of the invention any control means for controlling or governing the flow of liquid in the dispenser is contemplated, although the preferred construction utilizes a switch. Such a switch may control or operate a valve connected in a gravity flow or water displacement flow system. Various other types of liquid flow control means may be controlled by the switch. The contact points 42 are connected with the wires 43 leading to a source of electric power.

The switch operating means will now be described, in connection with Figure 2, and comprises a switch operating bell crank 46 secured to the switch operating shaft 47. An operating lever 48 is pivotally mounted on the bracket 49 secured in any suitable manner to the frame or housing 20 for the pump stand. The operating lever 48 carries an operating projection 50 which engages between the arms of the switch operating bell crank 46 so that upon upward movement of the operating projection 50, the bell crank is rotated in a counter-clockwise direction to open the switch, and upon downward movement of the operating projection 50, the bell crank 46 is moved in a clockwise direction to close the switch.

Means is provided for holding the switch operating lever 48 in both switch open and switch closed position, which means comprises a push rod 53, the end of which fits into a recess in the operating lever 48. The push rod 53 is projected against the operating lever by a spring 54, one end of which engages a collar upon the push rod 53 and the other end abuts against a bracket 55 which also carries a bearing in which the push rod 53 slides. This push rod holds the operating lever 48 in switch open position because of the fact that in this position the push rod engages the operating lever 48 at a point to the right of the pivot 51 upon which the lever is mounted. Upon moving the operating lever 48 to switch closed position, as shown in Figure 8, the force of the push rod is directed to the left of the pivot and holds the lever in switch closed position.

Preferably the operating lever 48 projects through the casing 20 and carries a nozzle supporting means 56 so that the operating lever can be controlled or operated simultaneously with the removal of the nozzle therefrom preparatory to delivering gasoline. The operating lever can be moved from switch closed position to open switch position by the act of placing the nozzle 28 upon the nozzle supporting means. The switch operating means which has been particularly described is merely illustrative and in the broader aspect of the invention any switch operating means is contemplated, such as the hose hook form illustrated, or a hose pull form of switch operating means may be used.

Means is provided for preventing the liquid flow control means from being operated to liquid flow position after the same has once been moved to liquid flow position and returned to initial position to stop the flow of liquid, or where a switch is used, to prevent the closing of the switch after it has once been closed and opened. The means particularly shown herein for accomplishing this purpose is a switch locking means comprising a switch locking lever 60 which is freely mounted upon the switch operating shaft 47 for pivotal movement. This switch locking lever has a push rod 61 which is impelled upwardly by the push spring 62, one end of which engages a collar carried by the push rod and the other end abuts against an abutment 63. This push rod is so located with respect to the shaft 47, upon which the switch locking lever 60 is mounted, that in one position, as shown in Figure 2, the force of the push rod 61 is directed to the right of the shaft so that it rotates the switch locking lever in a counter-clockwise direction. In the other position of the switch locking lever 60, as shown in Figure 3, the push rod 61 exerts its force to the left of the pivot point, formed by the switch operating shaft 47, so that the switch locking lever is rotated in a clockwise direction and held in this position. The switch locking lever 60 carries a locking abutment 64 which in its up or locking position latches with or engages with a switch locking projection 65 which is carried by the switch operating lever 48. A bolt or screw 66 through the switch locking projection provides an adjustable locking projection for the switch operating lever 48.

The switch locking means, and particularly the locking abutment 64, is shown in switch locking position in Figure 2 and is shown in released position in Figure 3. In the switch locking position, as shown in Figure 2, the switch operating lever 48 is prevented from being rotated in a counter-clockwise direction to close the switch 40 because of the engagement of the bolt 66 with the locking abutment 64. As shown in Figure 3, the locking lever 60 with its locking abutment 64 has been moved out of the way of the bolt 66 so that the switch operating lever 48 is free to be rotated in a counter-clockwise direction. In this position of the switch locking means, the switch 40 may be closed. Although the locking abutment 64 is long enough so that one end thereof engages the mounting plate 67, upon which all the parts are mounted, this is not an essential detail of construction since the locking abutment would just as effectively lock the switch in open position whether it so engages the mounting plate or not. The engagement of the locking abutment 64 with the mounting plate 67 is essential to provide a stop to limit the counter-clockwise movement of the switch locking lever 60. Any other form or location of stop for the locking lever is contemplated.

The switch locking means is connected with the switch operating means so that the locking means becomes effective to prevent the switch from being closed a second time after the switch has once closed and then opened. This operation of the switch locking means is accomplished by a pin 68 carried by the switch operating lever 48, which pin is received in a slot 69 carried by a link 70. The link is pivotally secured to the switch locking lever 60 by a pivot 71.

This connection between the switch operating means and the switch locking means operates in a manner now to be described. Upon clockwise rotation of the operating lever 48, which is accomplished by lifting up on the nozzle supporting means 56, the pin 68 abuts against the end of the slot 69 and pushes downwardly on the link 70 thereby rotating the switch locking lever 60 in a counter-clockwise direction to bring the locking abutment 64 into locking position. The push rod 61 and push spring 62 hold the locking lever 60 in this position, but the abutment is prevented from locking the switch locking lever 48 because the locking projection or bolt 66 has been rotated with the locking lever. The abutment merely rests against the switch locking projection 65, as shown in Figure 8. After the desired quantity of gasoline has been delivered, the switch is opened by pulling down on the nozzle supporting means 56 which rotates the switch locking projection 65 and bolt 66 in a clockwise direction and the switch is opened, whereupon the abutment 64 will pass into locking engagement with the bolt under the influence of the spring 62, as shown in Figures 1 and 2. The slot 69 is long enough so that rotation of the switch operating lever 48 in opening the switch will not pull upwardly on the link 70 to release the switch lock or remove the abutment 64 from locking position.

Resetting means is provided for returning the indicator or indicators 33 and 36 to zero position or reading. The indicator resetting means comprises a resetting shaft 72 on which there is a handle 73 for rotating the same. A frictional driving connection is included between the resetting shaft 72 or resetting handle 73 and the respective indicator or indicators. This frictional driving connection will be described hereinafter. It will be sufficient for the present to state that with a reading upon the indicators, rotation of the handle 73 will drive the shaft 74 and rotate a gear 75 which is secured to the shaft 74. The gear 75 meshes with a train of gears carried by a swingable arm like the arm 82, the last gear of the train meshing with a gear 76 connected with the indicator or register shaft for the register 36 for resetting the same to zero position.

A second gear 79 is secured to the shaft 74 and is connected through a train of gears to the gear 80 carried upon the indicator or dial shaft 81 for resetting or returning the gallon indicator to its zero reading. This driving connection, including the clutch device carried upon the clutch bar 82, is known to the art and hence it is not believed necessary to particularly describe this construction. It is only believed necessary to state that rotation of the resetting handle 73 creates friction upon the gears carried by the clutch bar 82 so that this clutch bar rises and brings the last gear 85, of the gear train carried by the clutch bar, into engagement with the gear 80. A rotatable stop 83 is so positioned that it engages the pawl 84 when the indicator pointers 34 and 35 have been returned to zero position so that the indicator or pointers cannot be turned past zero reading in the resetting operation.

The indicators particularly illustrated in Figures 1 through 4 are returned to zero reading by first returning one indicator, such as the indicator 36, to zero reading by rotation of the resetting shafts 72 and 74 in one direction, after which rotation of the resetting shafts in the other direction returns the other indicator to zero reading. The manufacturer of the combined indicators provides a resetting interlock between the indicators so that the cost register 36 must first be reset after which the gallon indicator is reset. The reason for this interlock is to prevent the operator from returning the gallon indicator to zero position after delivery of gasoline to one customer and leave a reading upon the cost register when a second delivery is made to a second customer. If the register permitted such operation, this second customer would be defrauded to the amount of the reading left upon the cost register from the first delivery and the operator would collect this sum twice.

The frictional driving connection in the resetting means is provided as part of the means connecting the resetting means with the switch locking means so that operation of the resetting means automatically releases the switch locking means when the indicators have been returned to zero reading, and the locking means is not released until the indicators are reset to zero reading. The frictional driving connection illustrated, includes a driving pin 88 which is secured to the resetting shaft 72. The driving pin 88 engages in a spiral means shown particularly as a spiral groove 89, which groove is carried by a sleeve 90. The indicator resetting shaft 72 fits into the bore of the sleeve 90 and is movable longitudinally or axially therein. The sleeve 90 is secured to the shaft 74 in any suitable manner. A plate 91 is also secured to the indicator resetting shaft 72 and spaced from the sleeve 90. A compression spring 92 is positioned between the plate 91 and the end of the sleeve 90.

The pitch of the spiral groove 89 and the strength of the compression spring 92 are so selected that a counter-clockwise rotation of the handle 73, as viewed from the right of Figures 2 and 3, will cause rotation of the sleeve 90 without any movement of the driving pin 88 in the spiral groove 89. In other words, the frictional driving connection is so selected that the driving connection is established so long as there is no greater driving load thereon than that required to reset the indicators. When, however, the indicators have been returned to zero position or reading, the driving connection is positively stopped, such as by the rotation stop 83 and pawl 84, whereupon the frictional driving connection is overcome and the pin 88 rotates in the spiral groove 89 and pulls the shaft 72 to the left against the compression of the spring 92. This movement of the indicator resetting shaft 72 to the left moves the plate 91 also to the left. The frictional driving connection particularly illustrated and described may take many forms, and any frictional driving connection is contemplated.

An arm 96, forming part of a lever 97, is engaged by the plate 91 as it moves to the left and is swung to the left thereby. The lever 97 is mounted upon a pivot 98 and movement of the arm of course also swings the lever 97 to the left. The end of the lever 97 carries a slot 99 in which is received a pin 100 carried by an arm 101 which forms part of the switch locking lever 60. Movement of the lever 97 to the left swings the arm 101 and the switch locking lever 60 in a clockwise direction to remove the locking abutment 64 from its locking position engaging the bolt 66.

Means is provided to prevent return or resetting movement of the indicators as long as the switch is in closed position or as long as the dispenser can be or actually is delivering gasoline. This means in the construction of Figures 1 through 4 includes a link 105 which is carried upon the pivot 68 on the switch operating lever 48. The link 105 is connected through a pivot 107a with a second link 106 which is pivoted at one end on a pivot 107 carried by a bracket 108 secured to any suitable fixed point on the dispenser. Intermediate of the ends of the link 106 is a pin 109 which is received in a slot 110 in a link 111. The link 111 is pivotally secured to the clutch bar 82 of the clutch means in the indicator resetting means for the dial indicator 33. Another link 112 carries a slot 115 at its lower end, which slot receives a pin 113 carried by the link 106. The other end of the link 112 is pivotally secured to the clutch bar 114 which is identical with the clutch bar 85 and the train of gears carried thereby connects the resetting means with the straight reading indicator or register 36.

The means for preventing resetting of the indicators of the liquid dispenser, so long as the switch is in closed position, operates in a manner now to be described. Upon rotation of the switch operating means, or particularly rotation of the switch operating lever 48 in a counter-clockwise direction, the link 105 is pushed downwardly which also pushes the link 106 downwardly so that the pin 109 engages or is adjacent the bottom of the slots 110 and 115 and propels the links 111 and 112 downwardly, or holds them down if they are already in their lowermost position. Downward movement of the link 111 holds the clutch bar 82 down so that the driving connection between the indicator resetting handle 73 and the gear 80 for the dial gallon indicator 33 is disconnected and hence cannot be reset when the switch is closed. Similarly, downward movement of the link 112 holds the clutch bar 114 down and the gear or driving connection with the gear 76 is disconnected so that it cannot be rotated to reset the straight reading register 36 to zero position. It will be observed, therefore, that so long as the switch operating lever 48 is in closed switch position, the indicators or registers cannot be returned to zero position by virtue of a disconnecting means. Any form of means for preventing resetting of the indicators, so long as the switch is in closed position, can be used.

In Figures 5 through 8 there is shown another form of construction for preventing resetting movement of the indicator or indicators so long as the fluid flow control means is in liquid flowing position. In other words, in the particular construction, in which a switch is illustrated as controlling the liquid flow means, the resetting means is locked against resetting movement so long as the switch is in closed position.

It is readily apparent that much of the structure of the particular form of resetting and interlocking mechanism shown in Figures 5 through 8 is identical with the construction shown in Figures 1 through 4. These identical parts will not be again described and will be numbered with the same part numbers as used in Figures 1 through 4. The operation of these identical parts in all of the figures is the same and will not be described again in connection with Figures 5 through 8. The parts which are not shown in Figures 1 through 4 will be described in detail.

The reset and interlocking mechanism now to be described is intended principally for that type of register or indicator which requires not over a fixed number of turns to reset the counter or register to zero reading. The indicator illustrated requires not over two turns to reset the same to zero reading and, of course, a resetting shaft may be geared to the indicator so that one rotation of the resetting shaft will reset the indicator.

One of the means in the form of invention shown in Figures 5 through 8, which differs from the means for producing a corresponding function or result in Figures 1 through 4, is the connection between the indicator resetting means and the switch locking means. This connection includes a cam 120 carried on an indicator resetting shaft 121. The resetting shaft is operated by a handle 122. This resetting shaft is connected with the resetting mechanism of the gallon indicator 123 and cost register or indicator 124 so that one complete revolution of this shaft will reset the indicators. It will be understood, of course, that a suitable gear ratio will be established between the resetting shaft 121 and the resetting mechanism of the indicators, depending upon the maximum number of turns required to reset the indicator. For example, indicators are known which require a maximum of two turns in order to reset them to zero reading. With such indicators, of course, the gear ratio between the resetting shaft 121 and the indicator resetting means will be in the ratio of 2:1.

Upon rotation of the indicator resetting shaft 121 in a clockwise direction, as shown in Figure 6, the cam 120 raises a lever 128 which is mounted at one end upon a pivot 129. One end of a link 130 is secured to the movable end of the link 128 and its other end is secured to the switch locking lever 60.

Upon rotation of the resetting handle 122, the cam 120 will be rotated thereby until it raises the lever 128 which also raises the link 130 and rotates the switch locking lever 60 in a clockwise direction to remove the locking abutment 64 from its locking position, as shown in Figure 5, whereupon the spring 62 and its associated push rod 61 hold the switch locking means in released position, as previously described.

Means is provided for preventing any resetting movement whatsoever of the indicators so long as the liquid flow control means is in liquid flowing position. In the construction particularly described herein, the liquid flow control means is a switch and consequently the means prevents any resetting movement whatever of the indicators so long as the switch is in closed position. The means for preventing resetting of the indicators, so long as the switch 40 is in closed position, comprises a locking means for the indicator resetting means including a slot 135 carried by any suitable part of the indicator resetting means, the slot being particularly shown herein as being carried by the hub of the cam 120. Means is then provided as part of the switch operating means, which means engages in the slot when the switch is in closed position and is removed from engagement in the slot when the switch is in open position. This means, which forms part of the switch operating means, is the end of the switch operating lever 48 which forms locking key 136 for the indicator resetting means.

Upon rotation of the switch operating lever 48 in a counter-clockwise direction in order to operate the bell crank 46 to close the switch 40, the key 136 enters the slot 135 so that the indicator resetting means is locked against any resetting movement whatever. Upon rotation of the switch operating lever 48 in a clockwise direction to open the switch, the key 136 is removed from the slot 135 so that the indicator resetting means is no longer locked against resetting movement.

It has been previously described how the switch locking means, which may be briefly represented by the locking abutment 64, operates to lock the switch operating lever 48 in open switch position after the switch operating lever has been moved first to close the switch and then returned to its initial position to open the switch. After this closing and opening of the switch, the locking abutment 64 becomes effective to lock the switch operating means, which may be briefly represented by the switch operating lever 48, in open switch position. The only way in which the lock can be released is by operating the indicator resetting means which rotates the cam 120 and releases the switch locking means so that the switch may be closed a second time for a second delivery of gasoline. The cam 120 is generally located in such a position that the switch locking means is not released until after the indicators have been reset to zero position or reading. When locking means 135, 136 are provided for the indicator resetting means, however, the location of the cam 120 is unimportant and it may be so positioned that the switch locking abutment 64 is released long before the indicators are reset because of the locking means 135, 136, as will now be explained.

Since the slot 135 is carried with the resetting means, this slot is so located that it is in position to be engaged by the locking key 136 only when the indicators have been returned to zero reading. In all other positions the slot is turned away from its position in which it can be engaged by the key 136 so that it is impossible for an operator to fraudulently operate the dispenser by partially resetting the indicators and making a second delivery of gasoline with the indicators having a partial reading thereupon. The slot 135 will not be rotated into a position where it can be engaged by the key 136 until the indicators have been reset to zero position. In any other position of the slot 135, the key 136 will engage the hub carrying the slot and will prevent the switch operating lever 48 from being operated to close the switch.

It is evident, therefore, that the key 136 and the slot 135 accomplish a double function. The first function is to prevent the switch from being operated to closed position so long as the resetting means has only been partially operated in its resetting movement and so long as complete resetting of the indicators to zero reading has not been accomplished. The second function comes into effect as soon as the resetting means has made even the slightest degree of rotation in the indicator resetting movement, whereupon the slot 135 and key 136 function as a locking means for the switch operating means to prevent closing of the switch until the indicators have been completely reset to zero reading. This operation may be described in a somewhat different way as follows, namely, the key 136 and the slot 135 provide a locking means preventing a second closing of the switch after the switch operating means has once been operated to close and open the switch 40 whenever any resetting movement of the indicator resetting means has occurred.

It is evident then, that the switch locking means, represented briefly by the abutment 64, need only be operative so long as the resetting means remains untouched after a delivery of gasoline has been made. Thereafter the key 136 and its cooperating slot 135 provide switch locking means excepting for one position, namely that position in which no resetting movement whatever of the resetting means has occurred. The switch locking means, briefly provided by the abutment 64, insures that the switch operating means locks the switch in open position in the one brief position in which the locking means, provided by the key 136 and slot 135, is ineffective.

Various modifications will occur to those skilled in the art in the configuration, composition and disposition of the component elements going to make up the invention as a whole, as well as in the selective combination or application of the respective elements, and no limitation is intended by the phraseology of the foregoing description or illustrations in the accompanying drawings.

What is claimed is:

1. An indicator resetting and switch interlocking mechanism for liquid dispensers having an indicator driven by liquid metering means and liquid flow producing means comprising, in combination, a switch having a switch operating shaft, switch operating means for closing and opening the switch including an operating lever, a pivot for the lever spaced from the switch operating shaft, a bell crank secured to the switch operating shaft, and a projection upon the operating lever engaging the bell crank to open and close the switch; switch locking means including a switch locking lever having a locking and a released position, means holding the locking lever in the position to which it is moved, the switch locking lever being pivoted upon the switch operating shaft and connected with the operating lever so that the locking lever is moved thereby to locking position upon closing of the switch, and a projection upon the operating lever which is engaged by the locking lever when the switch is opened and locks the operating lever upon opening of the switch for preventing the switch from being again closed; means for resetting the indicator to zero reading; and means connecting the switch locking lever with the resetting means so that when the resetting means is actuated to return the indicator to zero reading the switch locking means is released.

2. An indicator resetting and switch interlocking mechanism for liquid dispensers having an indicator driven by liquid metering means and liquid flow producing means controlled by a switch comprising, in combination; operating means for closing and opening the switch; switch locking means for preventing the switch from being closed; means for resetting the indicator to zero reading including a driving element, a driven element, and a frictional driving connection between the two elements which will transmit enough force to return the indicator to zero reading and which will move one element relatively to the other when the driven element is held by the indicator being at zero reading; and means connecting the switch locking means with the movable element of the resetting means so that the switch locking means is released when the indicators are returned to zero reading.

3. An indicator resetting and switch interlocking mechanism for liquid dispensers having an indicator driven by liquid metering means and liquid flow producing means controlled by a switch comprising, in combination, a pivoted switch operating lever to close and open the switch, switch locking means connected with the switch operating lever and rendered operative thereby upon closing and opening of the switch for preventing the switch from being again closed, means for resetting the indicator to zero reading including a pivoted gear arm which is normally disconnected from an indicator resetting gear carried by the indicator but meshes with the gear upon operation of the indicator resetting means, means connecting the switch locking means with the indicator resetting means so that when the indicator resetting means has returned the indicator to zero reading the switch locking means is released, and means connected with the pivoted switch operating lever and operated upon closing of the switch to prevent resetting of the indicator including a connection between the pivoted switch operating lever and the pivoted gear arm to hold the latter disconnected from the indicator resetting gear when the switch operating lever has moved the switch to closed position.

4. A liquid dispenser having liquid metering means and liquid flow producing means comprising, in combination, at least one indicator adapted to be driven by the liquid metering means, a switch controlling the liquid flow producing means, switch operating means to close and open the switch, switch locking means for preventing the switch from being immediately closed a second time after it has once been closed and opened, means for resetting the indicator to zero reading including a friction driving connection having at least two parts which move relatively to each other when one part is held stationary, and means for releasing the switch locking means operated by the movement of one part of the frictional driving connection relatively to the other part when the indicators have returned to zero reading.

5. A liquid dispenser having liquid metering means and liquid flow producing means comprising, in combination, at least one indicator adapted to be driven by the liquid metering means, a switch controlling the liquid flow producing means, switch operating means to close and open the switch, switch locking means connected with the switch operating means so that the former becomes operative after closing and opening movement of the switch and prevents the switch from being immediately closed a second time, means for resetting the indicator to zero reading including a friction driving connection having at least two parts which move relatively to each other when one part is held stationary, and means for releasing the switch locking means operated by the movement of one part of the frictional driving connection relatively to the other part when the indicators have returned to zero reading.

6. A liquid dispenser having liquid metering means and liquid flow producing means comprising, in combination, at least one indicator adapted to be driven by the liquid metering means, a switch controlling the liquid flow producing means, switch operating means to close and open the switch, switch locking means connected with the switch operating means so that the former becomes operative after closing and opening movement of the switch and prevents the switch from being immediately closed a second time, means for resetting the indicator to zero reading including a friction driving connection having at least two parts which move relatively to each other when one part is held stationary, means for releasing the switch locking means operated by the movement of one part of the frictional driving connection relatively to the other part when the indicators have returned to zero reading, and means connected with the switch operating means and controlling the indicator resetting means to prevent resetting movement of the indicator when the switch is in closed position.

7. An indicator resetting and switch interlocking mechanism for liquid dispensers having an indicator with a zero reading stop which indicator is driven by liquid metering means and liquid flow producing means controlled by a switch comprising, in combination; operating means for closing and opening the switch; switch locking means for preventing the switch from being closed; means for resetting the indicator to zero reading including a driving element, a driven element, and a frictional connection between the two elements which will transmit enough force to return the indicator to zero reading and which will move one element relatively to the other when the driven element is held by the indicator being at zero reading; the frictional connection including means having a spiral carried by one of the elements, a spiral engaging means carried by the other element so as to be moved thereby, and a spring preventing movement of the spiral engaging means along the spiral so long as the driven element is being actuated by the driving element; and means connecting the switch locking means with the movable element of the resetting means so that the switch locking means is released when the indicators are returned to zero reading.

8. An indicator resetting and switch interlocking mechanism for liquid dispensers having an indicator with a zero reading stop which indicator is driven by liquid metering means and liquid flow producing means controlled by a switch operating comprising, in combination; a switch operating lever for closing and opening the switch; a switch locking lever having a releasing position and a locking position engaging the operating lever to prevent the switch from being closed; means for resetting the indicator to zero reading including a driven element having an axially disposed spiral slot, a driving element carrying a pin engaging in the spiral slot and movable axially relatively to the driven element, and a spring between the two elements which will retain the pin stationary in the spiral slot until the indicator is returned to its zero reading stop and which will permit the driving element to move axially relatively to the driven element by the pin moving in the spiral slot when the driven element is held by the indicator stop at zero reading; and releasing means for the switch locking lever including a flange carried by the driven element and movable axially therewith, and a pivoted lever engaging the flange and connected with the switch locking lever so that the switch locking lever is released when the indicator is returned to zero reading.

9. An indicator resetting and switch interlocking mechanism for liquid dispensers having an indicator driven by liquid metering means and liquid flow producing means controlled by a switch comprising, in combination; a switch operating shaft; switch operating means for closing and opening the switch including an operating lever, and a pivot for the lever spaced from the switch operating shaft; a switch locking lever having a locking and a released position, the switch locking lever being mounted upon the switch operating shaft and being connected with the operating lever so that the locking lever is moved thereby to locking position upon closing of the switch and locks the switch operating lever upon opening of the switch and thereby prevents the switch from being again closed; means for resetting the indicator to zero reading including a driving element, a driven element, one of said elements being movable relatively to the other element, and a frictional connection between the two elements which will transmit enough force to return the indicator to zero reading and which will move one element relatively to the other when the driving element is held by the indicator being at zero reading; and means connecting the switch locking lever with the movable element of the resetting means so that the switch locking means is released when the resetting means is actuated to return the indicator to zero reading.

10. An indicator resetting and switch interlocking mechanism for liquid dispensers having an indicator with a zero reading stop which indicator is driven by liquid metering means and liquid flow producing means controlled by a switch comprising, in combination; a switch operating shaft; switch operating means connected with the switch operating shaft for closing and opening the switch including a switch operating lever, and a pivot for the lever spaced from the switch operating shaft; a switch locking lever having a locking and a released position, the switch locking lever being mounted upon the switch operating shaft and being connected with the switch operating lever so that it is moved thereby to locking position upon closing of the switch and locks the switch operating lever upon opening of the switch and thereby prevents the switch from being again closed; means for resetting the indicator to zero reading including a driving element, a driven element, one of said elements being movable relatively to the other element, and a frictional connection between the two elements which will transmit enough force to return the indicator to zero reading and which will move one element relatively to the other when the driven element is held by the zero reading stop of the indicator; the frictional connection including means having a spiral carried by one of the elements, a spiral engaging means carried by the other element so as to be moved thereby, and a spring preventing movement of the spiral engaging means along the spiral so long as the driven element is being actuated by the driving element; and means connecting the switch locking lever with the movable element of the resetting means so that the switch locking means is released when the resetting means is actuated to return the indicator to zero reading.

11. An indicator resetting and switch interlocking mechanism for liquid dispensers having an indicator with a zero reading stop which indicator is driven by liquid metering means, and liquid flow producing means controlled by a switch comprising, in combination; a switch operating shaft; a switch operating means for closing and opening the switch including a switch operating lever, and a pivot for the switch operating lever spaced from the switch operating shaft; a switch locking lever having a released position and a locking position engaging the switch operating lever to prevent the switch from being closed, the switch locking lever being mounted upon the switch operating shaft and being connected with the switch operating lever and being moved thereby to locking position upon closing of the switch so that it locks the switch operating lever upon opening of the switch and thereby prevents the switch from being again closed; means for resetting the indicator to zero reading including a driven element having an axially disposed spiral slot, a driving element carrying a pin engaging in the spiral slot and movable relatively to the driven element, and a spring between the two elements which will retain the pin stationary in the spiral slot until the indicator is returned to its zero reading stop and which will permit the driving element to move axially relatively to the driven element when the driven element is held by the indicator zero reading stop; and releasing means for the switch locking lever including a flange carried by the movable driving element of the indicator resetting means and movable axially therewith, and a pivoted lever engaging the flange and connected with the switch locking lever so that the switch locking lever is moved to released position when the indicator is returned to zero reading.

12. An indicator resetting and switch interlocking mechanism for liquid dispensers having a first indicator and a second indicator with a zero reading stop which indicators are driven by liquid metering means and liquid flow producing means controlled by a switch comprising, in combination; a switch operating means for closing and opening the switch, a switch locking means having a released position and a locking position engaging the switch operating lever to prevent the switch from being closed, the switch locking means being connected with the switch operating means and being moved thereby to locking position upon closing of the switch so that it locks the switch operating means upon opening of the switch and thereby prevents the switch from being again closed; means operable in one direction to reset one indicator to zero reading and operable in the reverse direction to reset the other indicator including a driven element having an axially disposed spiral slot, a driving element carrying a pin normally engaging in and at the end of the spiral slot and movable relatively to the driven element, and a spring between the two elements which will retain the pin stationary in the spiral slot until the indicator is returned to its zero reading stop and which will permit the driving element to move axially relatively to the driven element when the driven element is held by the indicator zero reading stop; and releasing means for the switch locking means including a flange carried by the movable driving element of the indicator resetting means and movable axially therewith, and a pivoted lever engaging the flange and connected with the switch locking means so that the switch locking means is moved to released position when the indicator is returned to zero reading.

13. An indicator resetting and switch interlocking mechanism for liquid dispensers having an indicator driven by liquid metering means and liquid flow producing means controlled by a switch comprising, in combination, a pivoted switch operating lever to close and open the switch, switch locking means connected with the switch operating lever and rendered operative thereby upon closing and opening of the switch for preventing the switch from being again closed, means for resetting the indicator to zero reading, means connecting the switch locking means with the indicator resetting means so that when the indicator resetting means has returned the indicator to zero reading the switch locking means is released, and means connected with the pivoted switch operating lever and operated upon closing of the switch to lock the indicator resetting means against resetting operation of the indicator including a slot movable with the indicator, and a key carried by the switch operating lever engaging the slot only when the indicator is at zero reading and the switch is closed.

WILLIAM J. PETER.
BASIL J. YANCHENKO.